United States Patent [19]
Sugiura et al.

[11] Patent Number: 4,718,326
[45] Date of Patent: Jan. 12, 1988

[54] TANDEM BRAKE BOOSTER

[75] Inventors: Yuzuru Sugiura, Anjo; Akihiko Miwa, Toyota, both of Japan

[73] Assignee: Aisin Seiki Kabushiki Kaisha, Kariya, Japan

[21] Appl. No.: 33,874

[22] Filed: Apr. 2, 1987

Related U.S. Application Data

[63] Continuation of Ser. No. 771,014, Aug. 30, 1985, abandoned.

[30] Foreign Application Priority Data

Aug. 30, 1984 [JP]  Japan ............................ 59-132077[U]

[51] Int. Cl.$^4$ ............................ F15B 9/10; F01B 19/00
[52] U.S. Cl. ................................ 91/369 A; 91/376 R; 92/48
[58] Field of Search .................... 92/48, 49; 91/369 A, 91/369 B, 369 C, 369 R, 376 R

[56]  References Cited
U.S. PATENT DOCUMENTS

| | | | |
|---|---|---|---|
| 4,173,172 | 11/1979 | Ohmi | 92/48 X |
| 4,512,237 | 4/1985 | Endoh et al. | 91/369 A |
| 4,516,474 | 5/1985 | Ochiai | 92/48 X |

FOREIGN PATENT DOCUMENTS 2915183  1/1980  Fed. Rep. of Germany .......... 92/48

Primary Examiner—Robert E. Garrett
Assistant Examiner—Mark A. Williamson
Attorney, Agent, or Firm—Oblon, Fisher, Spivak, McClelland & Maier

[57]  ABSTRACT

A tandem brake booster which includes a housing, front and rear movable walls positioned in the housing, a partition wall interposed between the front and rear movable walls and a valve mechanism provided in the rear movable wall for generating pressure difference between first and second constant pressure chambers and first and second variable pressure chambers. A key is inserted within a case member of the housing and serves to prevent excess movement of the case in an axial direction by blocking rotation of such case.

3 Claims, 7 Drawing Figures

TANDEM BRAKE BOOSTER

This application is a continuation of application Ser. No. 771,014, filed on Aug. 30, 1985, now abandoned.

BACKGROUND OF THE INVENTION

1. Field of the Invention

The present invention relates to a brake booster, and, more particularly, to a tandem brake booster.

2. Background of the Discussion

In a conventional tandem brake booster 10 which has been disclosed in Japanese Utility Model Application (publication no. 58-106265) illustrated in FIG. 1, a first passage 11 for communication between first and second variable pressure chambers 12, 13 is formed by a hole 14 provided on a cylindrical hub 15 of a front movable wall 16 and by hole 17 provided on a cylindrical hub 18 of a rear movable wall 19. A second passage 20 for communication between first and second constant pressure chambers 21, 22 is formed by a hole 23 provided on a case 24 assembled within both cylindrical hubs 15, 18 and by recesses 25, 26 provided on the cylindrical hub 15. In this tandem brake booster 10, inner peripheral edge portions of each diaphragm 27, 28 at both movable walls 16, 19 are utilized as a seal member for both passages 11, 20.

Movable walls 16, 19 are connected by the case 24 to each other and the forward actuating force operating on both movable walls 16, 19 is acted on an output push rod 29 through a reaction rubber disc 30 assembled within a stepped portion 31 of the case 24 and the reaction acts on a valve plunger 32 slidably inserted into a small diameter portion of the case through the reaction rubber disc 30.

A valve mechanism 33 is provided for generating a pressure difference between both constant pressure chambers 21, 22 and both variable pressure chambers 12, 13 by the valve plunger 32, a cylindrical valve 34 and a valve seat 35 provided on the cylindrical hub 18. The amount of sliding of the valve plunger 32 with respect to the cylindrical hub 18 is limited by a key 36 which is inserted into radial holes 37, 38 provided on the cylindrical hub 18 and on the case 24 and is engaged with a small diameter portion of the valve plunger 32 at a fork shaped inner end portion thereof. The axial extent of the radial holes 37, 38 is greater than the thickness of the key 36, so that the key 36 can be moved in a forward and rearward direction by a predetermined amount with respect to cylindrical hub 18 and the case 24.

The key 36 is provided with a contacting portion 39 which is engageable with a housing 46. The contacting portion 39 of the key 36 is contacted with the housing 20 and rearward movement of the valve plunger 32 with respect to the housing 46 is stopped as shown in FIG. 1 which illustrates a non-actuating state of the booster apparatus 10. In addition, further rearward movement of both movable walls 16, 19 is also stopped by contact of a front wall of the radial hole 37 with a front face of the key 36. A rear end of the valve plunger 32 is contacted with the cylindrical valve 34 and cylindrical valve 34 is lifted from the valve seat 35 by a slight amount.

The vacuum transmitted to both constant pressure chambers 21, 22 from a connector 40 mounted on the housing 20 is also transmitted to both variable pressure chambers 12, 13 through a hole 41 provided on the cylindrical hub 18, a clearance between the cylindrical valve 34 and the valve seat 35, and a hole 42 provided on the cylindrical hub 18, so that the pressure difference between constant pressure chambers 21, 22 and variable pressure chambers 12, 13 is eliminated.

As mentioned above, the cylindrical valve 34 is only slightly lifted from the valve seat 35 in the non-actuating state. Therefore, a small forward stroke of an input push rod 43 is required for seating the cylindrical valve 34 on the valve seat 35 and releasing the rear end of the valve plunger 32 from the cylindrical valve 34 to thereby communicate the atmosphere into both variable pressure chambers 12, 13 in the actuating state. The required pressure difference between constant pressure chambers 21, 22 and variable pressure chambers 12, 13 is rapidly generated and the movable walls 16, 19 are also rapidly forwardly moved. The contacting portion 39 of the key 36 is released from the housing 46 by the forward movement of the movable walls 16, 19 during actuation, so that the valve plunger 32 is contacted with the key 36 by the release of the input push rod 43 and is then rearwardly moved with the key 36 to the cylindrical hub 18, until the rear face of the key 36 is contacted with a rear wall of the radial hole 37. Further, the rear end of the valve plunger 32 is contacted with the cylindrical valve 34 and the cylindrical valve 34 is lifted from the valve seat 35 by a relatively large amount. Consequently, the atmosphere within variable pressure chambers 12, 13 quickly flows into constant pressure chambers 21, 22 and the pressure difference between constant pressure chambers 21, 22 and variable pressure chambers 12, 13 is rapidly decreased, and then movable walls 16, 19 are quickly and rearwardly moved.

In the situation where rearward movement of movable walls 16 and 19 occurs, before a part 39 of key 36 contacts with the housing, the valve plunger 32 and the key 36 are rearwardly moved as one by the distance of the movable walls 16 and 19 under the condition where the gap between the front surface of key 36 and the front surface of radial hole 37 exists due to the rear surface of key 36 being connected with the rear surface of radial hole 37.

At such time, the gap between seat 35 and valve 34 is the maximum distance.

When the part 39 of key 36 is contacted with housing, rearward movements of key 36, valve plunger 32 and valve 34 are stopped. However, the movable walls 16 and 19 are further rearwardly moved until the front surface of radial hole 37 is contacted with the front surface of key 36. The extent of the gap formed between seat 35 and valve 34 is decreased and restored to its original infinitely small value by the rearward movement of movable walls 16 and 19 after the part 39 of key 36 is contacted with the housing.

In the above-mentioned booster apparatus, the case 24 is fixedly inserted into both cylindrical hubs 15, 18 and is prevented from being dislodged by a clip 44 fixedly connected at the rear end thereof and is fixed by a nut 45 screwed at the top end thereof and which integrally connects both cylindrical hubs 15, 18. Therefore, such increase of the required number of parts and the corresponding assemblying process, and is of course expensive.

SUMMARY OF THE INVENTION

An object of the present invention is to provide an improved tandem brake booster which obviates the aforementioned drawbacks of the described conventional tandem brake booster.

A further object of the present invention is to provide an improved tandem brake booster which has high reliability in operation.

A still further object of this invention is to provide an improved tandem brake booster which is relatively simple in construction and includes a minimal number of parts.

According to the present invention, a tandem brake booster having a housing, front and rear movable walls installed within the housing, a partition wall interposed between the front and rear movable walls, two front constant pressure chambers formed by each movable wall and two rear variable pressure chambers formed by each movable wall divided by the front and rear movable walls and the partition wall, a first communicating passage communicating with both variable pressure chambers, a second communicating passage communicating with both contant pressure chambers, valve means provided in the rear movable wall for generating a pressure difference between both constant pressure chambers and both variable pressure chambers and forwardly moving both movable walls, a cylindrical case having small and large diameter portions assembled within a hub portion of both movable walls, a reaction rubber disc assembled within a stepped portion of the case, input and output push rods, a valve plunger slidably inserted into the small diameter portion of the case and formed for the valve means and connected to the input push rod, and a key member inserted into a radial hole of the rear movable wall and a radial hole of the case and engaged with the valve plunger for limiting sliding of the valve plunger to the rear movable wall and movable in the case in the forward and rearward direction by a predetermined amount, whereby the forward actuating force of both movable walls acts on the output push rod via the case and the reacton rubber disc and its reaction acts on the valve plunger via the reaction rubber disc. The movable wall is further rearwardly moved upon rearward movement of both movable walls after a part of the key member is contacted with the housing and rearward movement of the valve plunger in the housing is stopped. The tandem brake booster is characterized by the fact that first and second projections provided on a circumferential surface of a hole of the rear movable wall and an outer circumference of the small diameter portion of the case respectively are engaged with each other and forward movement of the case toward the rear movable wall is blocked, when the key member is positioned in the hole of the rear movable wall and in the hole of the case and rotation of the case with respect to the rear movable wall is limited, and the first and second projections are engaged and disengaged by rotating the case within the rear movable wall, when the key member is not positioned in the rear movable wall and the hole of the case.

Accordingly, clips and nuts as in the conventional brake booster are not required, and the construction is relatively simple such that a minimum number of parts is required in the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
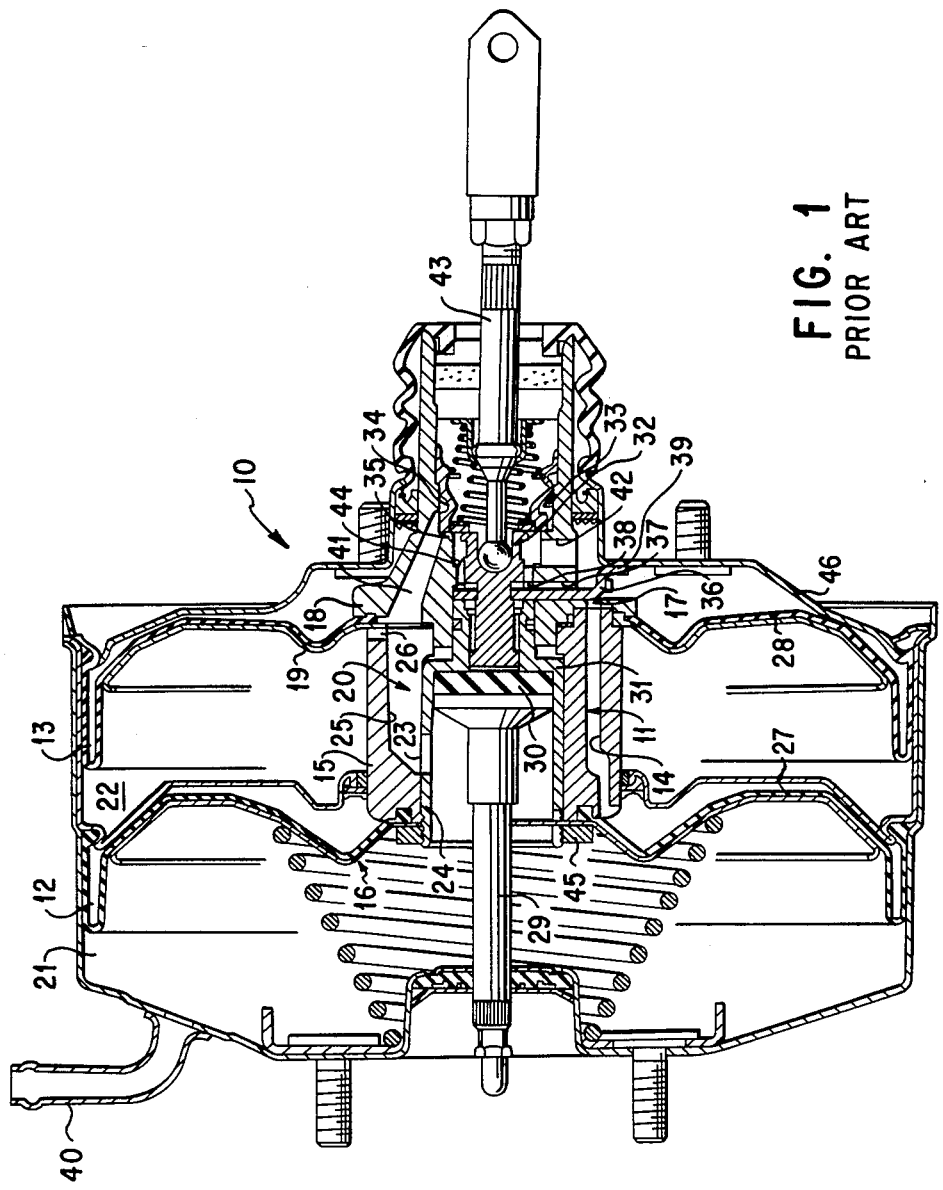
FIG. 1 is a cross-sectional view which shows a conventional tandem brake booster.
Figure 2:
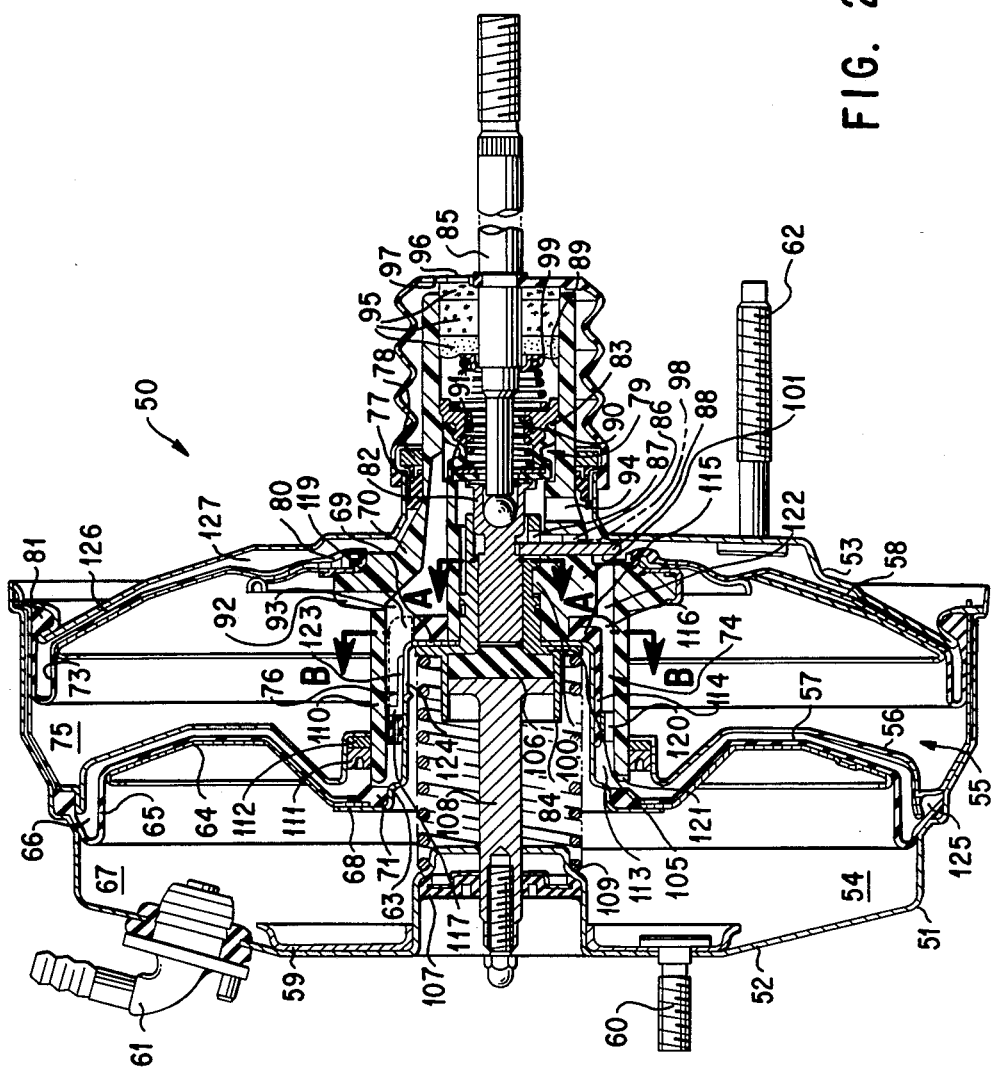
FIG. 2 is a view similar to FIG. 1, but showing a preferred embodiment of a tandem brake booster according to the present invention.
Figure 3:
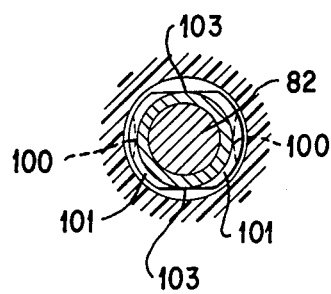
FIG. 3 is a cross-sectional view taken along A—A in FIG. 2.

Referring now to FIG. 2 which shows a preferred embodiment of a tandem brake booster 50 according to the present invention, reference numeral 51 denotes a housing which is provided with a front shell 52 and an opposed rear shell 53 and is airtightly secured at opposing end faces of shells 52, 53. The case 51 is divided into a front chamber 54 and a rear chamber 55 by a partition wall 56 located therein. A pair of movable walls 57, 58 are disposed within each chamber 54, 55.

A reinforcement plate 59 is fixedly connected to a front surface of the interior of front shell 52 and a plurality of bolts 60 are fixed to the reinforcement plate 59. Each bolt 60 airtightly penetrates the reinforcement plate 59 and the front shell 52 and forwardly projects so as to function as an attaching bolt of a master cylinder (not shown). A connector 61 connected to an intake manifold (not shown) of a vehicle engine is airtightly attached to an upper portion of a front wall of the front shell 52.

A plurality of bolts 62 are fixed to a rear wall of the rear shell 53. Each bolt 62 airtightly penetrates the rear shell 53 and rearwardly projects for functioning as an attaching bolt on a vehicle body.

The front movable wall 57 includes a hub member 63, an annular plate 64 and a diaphragm 65 and divides the front chamber 54 into a variable pressure chamber 66 and a constant pressure chamber 67. The hub member 63 is of a cylindrical shape and is provided with an outward flange 68 at a front end thereof and a bottom wall 69 at a rear end thereof. Further, the hub member 63 penetrates the partition wall 56, extends into the rear chamber 55 and contacts with a hub member 70 of the rear movable wall 58. The plate 64 is welded to the outward flange 68 of the hub member 63. The diaphragm 65 is located at a rear face of the plate 64. An inner circumferential bead portion 71 is fixedly and airtightly connected to a shoulder portion of the hub member 63, and an outer circumferential bead portion 125 is also fixedly and airtightly connected between the front shell 52 and the partition wall 56.

The rear movable wall 58 includes the hub member 70, an annular plate 126 and a diaphragm 73. The rear chamber 55 is divided into a variable pressure chamber 127 communicated to the front variable pressure chamber 66 by a first communicating passage 74 and a constant pressure chamber 75 communiated with the front constant pressure chamber 67 by a second communicating passage 76. The hub member 70 is projected outward of the housing 51 through a seal member 77 and a bush 78 and valve mechanism 79 is installed therein. The plate 126 is airtightly fixed to a stepped portion of the hub member 70 with an inner circumferential bead portion 80 of the diaphragm 73. The diaphragm 73 is located at a rear face of the plate 126 and an outer circumferential bead portion 81 is airtightly connected between the rear shell 53 and the partition wall 56.

The valve mechanism 79 operates for communicating the variable pressure chamber 127 with the constant pressure chamber 75 or to atmosphere and includes a valve plunger 82, a cylinder valve 83, etc. The valve plunger 82 is assembled into a case 84 with push rod 85 connected to the case 84. The push rod 85 is connected to a brake pedal (not shown). Further a key 88 is inserted into a radial hole 86 of the hub member 70 and a radial groove 87 of the case 84 and an inner end of the key 88 is engaged with the valve plunger 82 for limiting leftward movement of the valve plunger 82 relative to the hub member 70.

Figure 5:
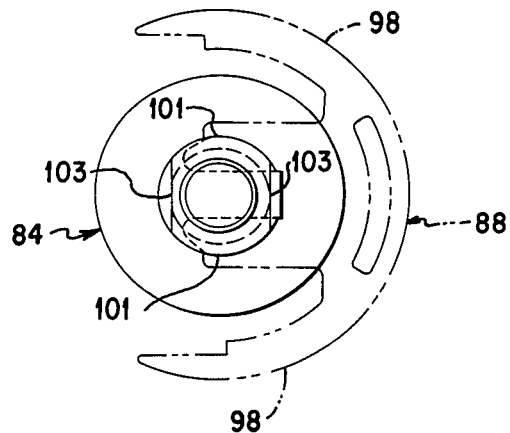
FIG. 5 is a front view showing the case of FIG. 2.
Figure 7:
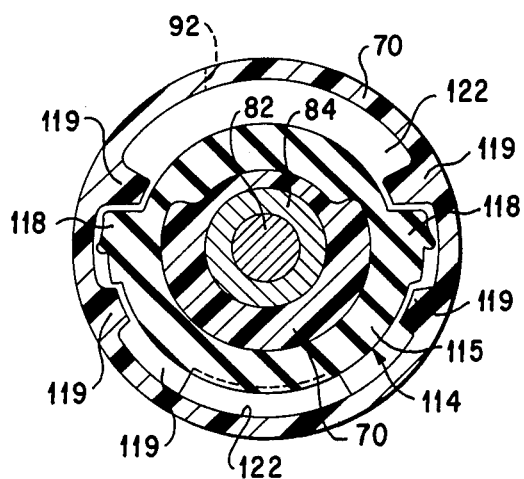
FIG. 7 is a cross-sectional view taken along line B—B in FIG. 2.

The cylindrical valve 83 is assembled within an inner hole 89 of the hub member 70 at the rear of the valve plunger 82 and is forwardly urged by a spring 90 and is selectively engaged with a rear end face of the valve plunger 82 or an inner hole stepped portion (valve seat) 91 of the hub member 70 according to the axial movement of the push rod 85. When the cylindrical valve 83 is engaged with the rear end face of the valve plunger 82 and is separated from the inner hole stepped portion 91 in this valve mechanism 79 (i.e., upon rightward movement), the constant pressure chamber 75 is in fluid communication with the variable pressure chamber 127 through a hole 92, a hole 93, the inner hole 89 and a hole 94. When the cylindrical valve 83 is engaged with the inner hole stepped portion 91 and is separated from the rear end face of the valve plunger 82 (i.e., upon leftward movement), the variable pressure chamber 127 is in fluid communication with atmosphere through the hole 94, the inner hole 89 of the hub member 70, an inner hole of the cylindrical valve 83, air filters 95, and a hole 96 provided on a boot 97. The key 88 is forwardly and rearwardly moved within radial hole 86 and radial groove 87 and surrounds the outer peripheral portion of the hub member 70 as is shown in FIG. 5.

The key 88 has a contacting portion 98 contacting the rear shell 53 at the designated position (i.e., returning position). The relative position of the hub member 70 and the valve plunger 82 is determined by the key 88. The cylindrical valve 83 is engaged with the rear end face of the valve plunger 82 and is contacted with the inner hole stepped portion 91 (although optionally a gap may be provided therebetween). Accordingly, when the input push rod 85 is forwardly moved against a spring 99, the variable pressure chamber 127 rapidly communicates with atmosphere.

The case 84 is of a stepped cylindrical shape and is airtightly fixed to the hole 89 of the hub member 70 at the small diameter portion thereof and is prevented from rotation by the key 88. The case 84 is also prevented from becoming dislodged by projections 100 which are integrally formed on the hub member 70 and projections 101 integrally formed on the case 84. Namely, as shown in FIGS. 2 to 5, a pair of projections 100, 100 are integrally formed on the inner hole circumferential face of the hub 70 in which the small diameter portion of the case 84 is fitted.

Figure 6:
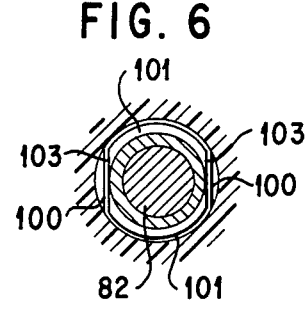
FIG. 6 is a view similar to FIG. 3, but showing the case being assembled.
Figure 4:
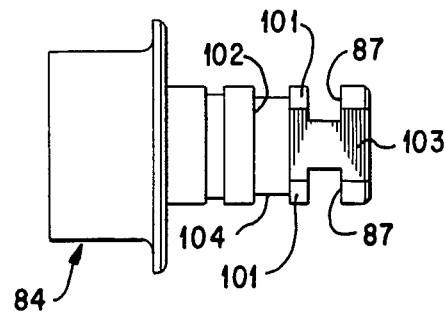
FIG. 4 is a side view showing the case of FIG. 2.

The case 84 is provided with an annular groove 104 and two recessed portions 103, 103 and a pair of projections 101, 101. When the case 84 is assembled within the hub 70, recessed portions 103, 103 of the case 84 are placed at almost the same angle with the corresponding projections 100 and then case 84 is inserted into the hub member 70 as clearly shown in FIG. 6. The case 84 is further inserted into the hub member until it contacts with the projections 100, 100. The case 84 is then slightly rotated until the projections 100, 100 and the recessed portions 103, 103 face each other to thereby release the engagement between rear end of the case 84 and the projections 100.

If a stepped portion 102 of the case 84 is contacted with the projections 100, 100, the case 84 is rotated at a right angle and the projections 101, 101 are engaged with the projections 100, 100. Then the key 88 is inserted into the radial hole 86 and radial groove 87 and the case 84 is firmly connected to the hub 70 in order to prevent the case 84 from excess movement in an axial direction by blocking rotation of the case 84.

A stepped portion 105 of the case 84 having an outward flange is contacted with the bottom wall 69 of the hub member 63 at the front movable wall 57. The case 84 receives the valve plunger 82 within the small diameter hole and a reaction rubber disc 106 at the inner hole stepped portion. The reaction rubber disc 106 is connected at the front face thereof with the rear end of an output push rod 108 which is projected out of the housing 51 through a seal member and is engaged with the piston of the master cylinder (not shown). A spring 109 is engaged with the front face of the outward flange of the stepped portion 105 and both movable walls 57, 58 are rearwardly urged by the spring 109.

In the brake booster 50 according to the present invention, a cylindrical portion 110 is integrally provided with the hub member 70 of the rear movable wall 58 and penetrates the partition wall 56 and is forwardly extended through a seal member 111 and a bush 112. The cylindrical portion 110 is overlapped on a cylindrical portion of the hub member 63 at the front movable wall 57, is fixed thereto and forms a cylindrical space 113 with the cylindrical portion of the hub member 63. A cylindrical seal member 114 made of rubber is interposed within the cylindrical space 113. The cylindrical seal member 114 is provided with an inward flange 115 which is airtightly fitted between the case 84 and the hub member 70 with the bottom of the bottom wall 69 of the hub member 63 at the rear end thereof. The cylindrical seal member 114 includes a groove 116 extending from the front end to the rear end at the circumferential wall thereof and a recess 117 provided from the middle portion to the rear end thereof. Further, the cylindrical seal member 114 is airtightly contacted with the hub member 63 and the cylindrical portion 110 at the inner and outer circumferential surfaces thereof. A pair of projecting portions 118, 118 which respectively engage with a pair of ribs 119 provided on the inner circumference, are axially provided on the outer circumference of the cylindrical seal member 114 and determine the position of the cylindrical seal member 114. The airtight connection between the inward flange 115 and the hub member 70 is not damaged, when a certain play in the axial direction between the case 84 and the hub member 70 exists.

A first passage 120 formed by the groove 116, the hub member 63, and the cylindrical portion 110 is communicated with the front variable pressure chamber 66 through a hole (recess) 121 formed on the front end of the cylindrical portion 110 and a gap between the cylindrical portion 110 and the diaphragm 65 and is also communicated with the rear variable pressure chamber 127 through the hole 122 which is provided on the hub member 70 and penetrates the hub member 70.

The first communicating passage 74 for communicating both variable pressure chamber 66, 126 includes the first passage 120, the hole (recess) 121 and the hole 122, etc. A second passage 123 formed by the second recess 117, the hub member 63, and the cylindrical portion 110, is communicated with the front constant pressure chamber 67 through a hole 124 provided on the rear portion of the circumferential wall of the hub member 63 and is also communicated with the rear constant pressure chamber 75 through the holes 93, 92 provided on the hub member 70 (when the hole 92 is positioned slightly more forward than the position illustrated, just through the hole 92). The second communicating passage 76 includes the second passage 123, the hole 124, and holes 93, 92.

By the foregoing, there has been disclosed a preferred form of tandem brake booster constructed in accordance with the present invention. It will be appreciated that various additions, substitutions, modifications and omissions may be made thereto without departing from the spirit of the invention.

What is claimed as new and desired to be secured by Letters Patent of the United States is:

1. A tandem brake booster, comprising:
   a housing;
   front and rear movable walls positioned within said housing wherein said rear wall includes a hub member, said hub member having a hole formed therein;
   a partition wall interposed between said front and rear movable walls;
   first and second constant pressure chambers and first and second variable pressure chambers formed by said movable walls and said partition wall;
   first communicating passage means for intercommunicating said variable pressure chambers;
   second passage means for intercommunicating said constant pressure chambers;
   valve means provided in said rear movable wall for generating a pressure difference between each of said constant pressure chambers and each of said variable pressure chambers and for forwardly moving said movable walls;
   a cylindrical case having a radial groove formed therein, a stepped portion and small and large diameter portions positioned within said hole in said hub member;
   a spring engaged with said case so as to urge said movable walls rearwardly;
   a reaction rubber disc positioned within said stepped portion of said case;
   an input push rod;
   an output push rod;
   a valve plunger slidably inserted into said small diameter portion of said case and connected to said input push rod;
   a key member positioned within a radial hole of said hub member and said radial groove of said case and engaged with said valve plunger for limiting sliding of said valve plunger with respect to said rear movable wall such that a forward actuating force of said movable walls acts on said output push rod via said case and said reaction rubber disc wherein a reaction force thereof acts on said valve plunger via said reaction rubber disc wherein upon rearward movement of said movable walls, the movable walls are further rearwardly moved after the rearward movement of valve plunger against housing is stopped due to said key being contacted with said housing; and
   a first projection integrally formed on an inner circumferential surface of said hole of said hub member forward of said key member and a second projection integrally formed on an outer circumference of said small diameter portion of said case, respectively, wherein said first projection selectively engages said second projection such that forward axial movement of said case towards said rear movable wall is blocked when said key member is positioned in said hub member and within said radial hole of said case and rotation of said case with respect to said hub member is limited, and wherein said first and second projections are selectively engageable and disengageable by rotation of said case within said hub member when said key member is not positioned in said hub member and said radial hole of said case.

2. A tandem brake booster as set forth in claim 1, wherein said first projection is integrally formed with a second hub member and said second projection is integrally formed with said case.

3. A tandem brake booster as set forth in claim 2, wherein said case has an annular groove formed therein and first and second recess portions formed therein for contact with said first and second projections.

* * * * *

UNITED STATES PATENT AND TRADEMARK OFFICE
CERTIFICATE OF CORRECTION

PATENT NO. : 4,718,326

DATED : 01/12/88

INVENTOR(S) : Yuzuru Sugiura et al.

It is certified that error appears in the above-identified patent and that said Letters Patent is hereby corrected as shown below:

At Column 2, line 61, delete "and"; at Column 4, line 62, correct the spelling of "communicated"; and at Column 8, line 22, after "key" insert --member--.

Signed and Sealed this

Twelfth Day of July, 1988

Attest:

DONALD J. QUIGG

Attesting Officer

Commissioner of Patents and Trademarks